(12) United States Patent
Sweeney

(10) Patent No.: US 10,706,826 B1
(45) Date of Patent: Jul. 7, 2020

(54) FLIP RING FOR HOLDING A GUITAR PICK

(71) Applicant: Mark Christian Sweeney, Fort Walton Beach, FL (US)

(72) Inventor: Mark Christian Sweeney, Fort Walton Beach, FL (US)

(*) Notice: Subject to any disclaimer, the term of this patent is extended or adjusted under 35 U.S.C. 154(b) by 0 days.

(21) Appl. No.: 16/699,168

(22) Filed: Nov. 29, 2019

(51) Int. Cl.
*G10D 3/173* (2020.01)
*F16M 13/04* (2006.01)

(52) U.S. Cl.
CPC ............ *G10D 3/173* (2020.02); *F16M 13/04* (2013.01)

(58) Field of Classification Search
CPC ................................ G10D 3/173; F16M 13/04
See application file for complete search history.

(56) References Cited

U.S. PATENT DOCUMENTS

2015/0075352 A1* 3/2015 McDonald ............. G10D 3/173
84/322

* cited by examiner

*Primary Examiner* — Kimberly R Lockett
(74) *Attorney, Agent, or Firm* — Peter Loffler

(57) ABSTRACT

A guitar pick holder uses a finger or thumb worn ring to which the guitar pick is attached. The ring has a riser on its outer circumference, the riser having a pair of opposing openings. An offset clasp is rotatably received within the opening of the guitar pick with the guitar pick slid to a desired position on the offset clasp. The offset clasp is rotatably attached to the riser via a pair of prongs on the offset clasp that face each other such that each prong is received within one of the riser openings. The prongs are able to rotate within their respective opening.

11 Claims, 9 Drawing Sheets

US 10,706,826 B1

FLIP RING FOR HOLDING A GUITAR PICK

BACKGROUND OF THE INVENTION

1. Field of the Invention

The present invention relates to a guitar pick that is rotatably attached to a finger or thumb worn ring so as to allow for flipping a guitar pick out of the way to allow finger playing of the guitar.

2. Background of the Prior Art

A guitar pick or plectrum is used by musicians to strum chords and to sound individual notes on a guitar. The guitar pick is a generally acute isosceles triangle shaped member that has two rounded corners and a third corner, typically the picking corner, that is less rounded. The guitar pick tends to be made from a single material such as plastic, wood, metal, etc. Many musicians grasp the guitar pick between their thumb and index finger so that the pointed corner of the pick faces the strings of the guitar and play in a desired technique which is based on choice and style.

While some guitarists are finger plucking purists, a large number of guitarists use a guitar pick, so that the guitar pick is an indispensable part of their equipment. Guitarists carry multiple picks to each gig to be sure that a pick is always available. However, guitarists who use a guitar pick also finger pluck the strings as each technique produces unique tones not achievable by the other technique. Often, a guitarist will change between pick play and finger plucking several times over the course of a song in order to produce a rich and varied sound. When the guitarist changes from the use of a pick to finger plucking, they must place the pick somewhere as they need their entire hand free to pluck the strings. Guitarists put the pick into their mouth, onto a mic stand, onto a chair, or just about any place else that is convenient. While such movement of the pick is performed very quickly, it still necessitates the guitarist's hand leaving the guitar resulting in a "gap" in the sound. When the pick is retrieved, the hand must again leave the guitar resulting in another gap. If the pick is dropped during its movement, further problems arise.

What is needed is a device that allows for a seamless transition, back and forth, from using the pick to not using the pick, without the pick ever having to leave the finger or the thumb of the musician and the hand not ever having to leave the guitar. Such a device must be easy to use and must not interfere with the playing of the guitar by the musician.

SUMMARY OF THE INVENTION

The flip ring for holding a guitar pick of the present invention addresses the aforementioned needs in the art by providing a device that weds the guitar pick to the user's finger or thumb which allows for a seamless transition, back and forth, from using the pick to not using the pick, without the pick ever having to leave the finger or thumb of the musician and the musician's hand not ever having to leave the guitar. This allows the guitarist to switch between pick play and finger plucking without missing a beat. The flip ring for holding a guitar pick prevents the accidental dropping of the pick. The flip ring for holding a guitar pick can be used as a training tool for new musicians to get used to holding a pick or learning how to use a pick, while transitioning between pick play and finger plucking. The flip ring for holding a guitar pick does not interfere with the guitarist's play, either pick play or finger plucking, so that the guitarist plays the guitar in their standard style. The flip ring for holding a guitar pick is relatively easy to use. The flip ring for holding a guitar pick is of relatively simple design and construction, being produced using standard manufacturing techniques, so as to be relatively inexpensive to produce so as to be economically attractive to potential consumers for this type of device.

The flip ring for holding a guitar pick of the present invention is comprised of a ring member that has an inner circumference and an outer circumference and a first longitudinal axis that passes through the opening bounded by the inner circumference. A riser is located on a portion of the outer circumference. The riser has a pair of opposing riser openings such that a second longitudinal axis passes through the pair of riser openings. The second longitudinal axis is oriented substantially normal with the first longitudinal axis. An offset clasp is received within the pick opening of the guitar pick. The offset clasp is attached to each of the pair of riser openings and is capable of rotating with respect to the riser and thus the ring member. The offset clasp has a pair of prongs that face one another such that each prong is received within a respective one of the riser openings and is able to rotate within its riser opening. The offset clasp is made from a resilient material.

Alternately, the flip ring for holding a guitar pick is comprised of an elongate member, made from a resilient material, that is formed into a closed loop ring and crimped into this configuration. The elongate member is received within the guitar pick opening prior to the crimp attachment. The ring member is worn on a finger or thumb and resiliently held thereon.

BRIEF DESCRIPTION OF THE DRAWINGS

Similar reference numerals refer to similar parts throughout the several views of the drawings.

DESCRIPTION OF THE PREFERRED EMBODIMENT

Figure 1:
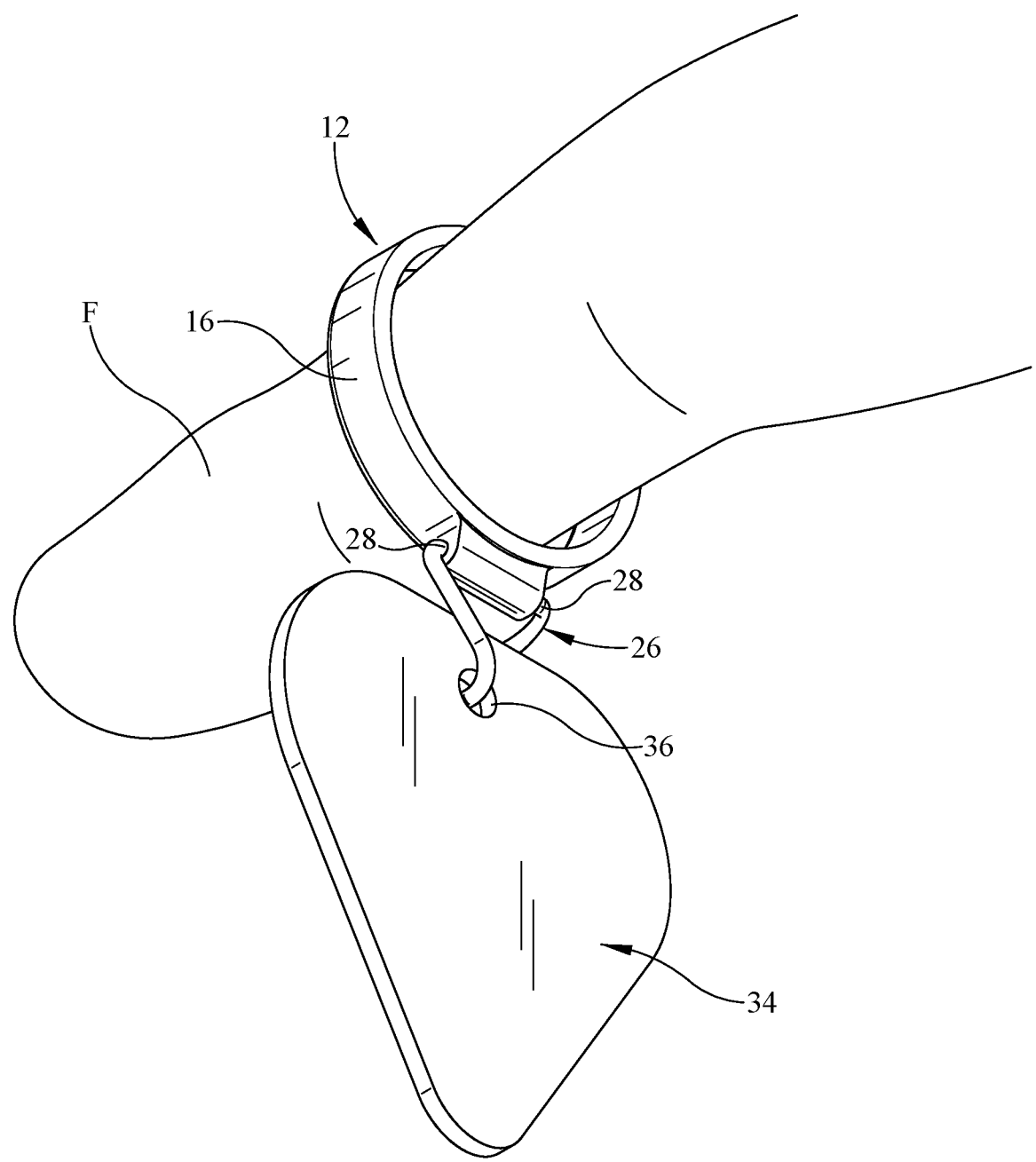
FIG. 1 is an environmental view of the flip ring for holding a guitar pick of present invention secured to a user's finger.
Figure 2:
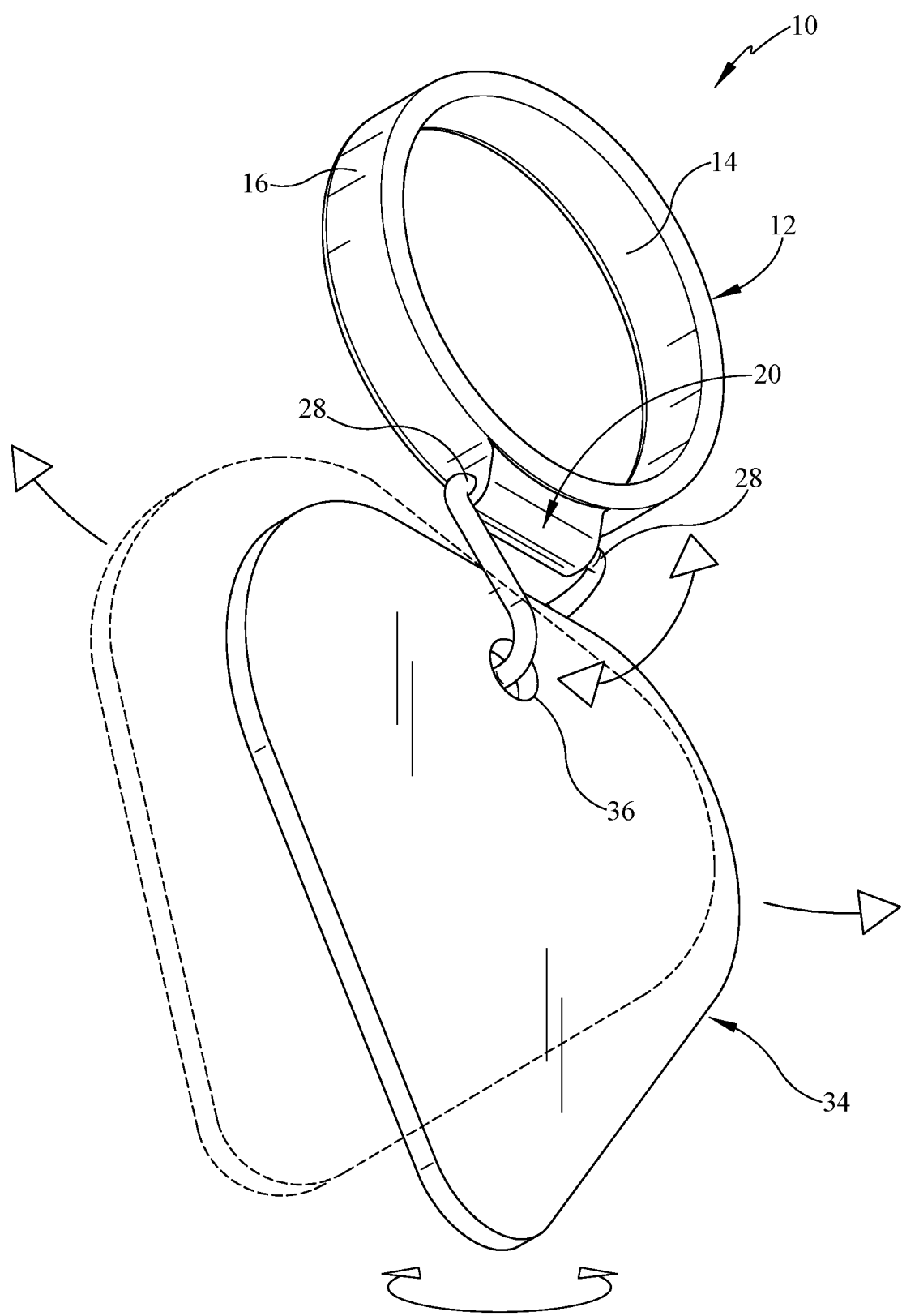
FIG. 2 is a perspective view of the flip ring for holding a guitar pick.
Figure 3:
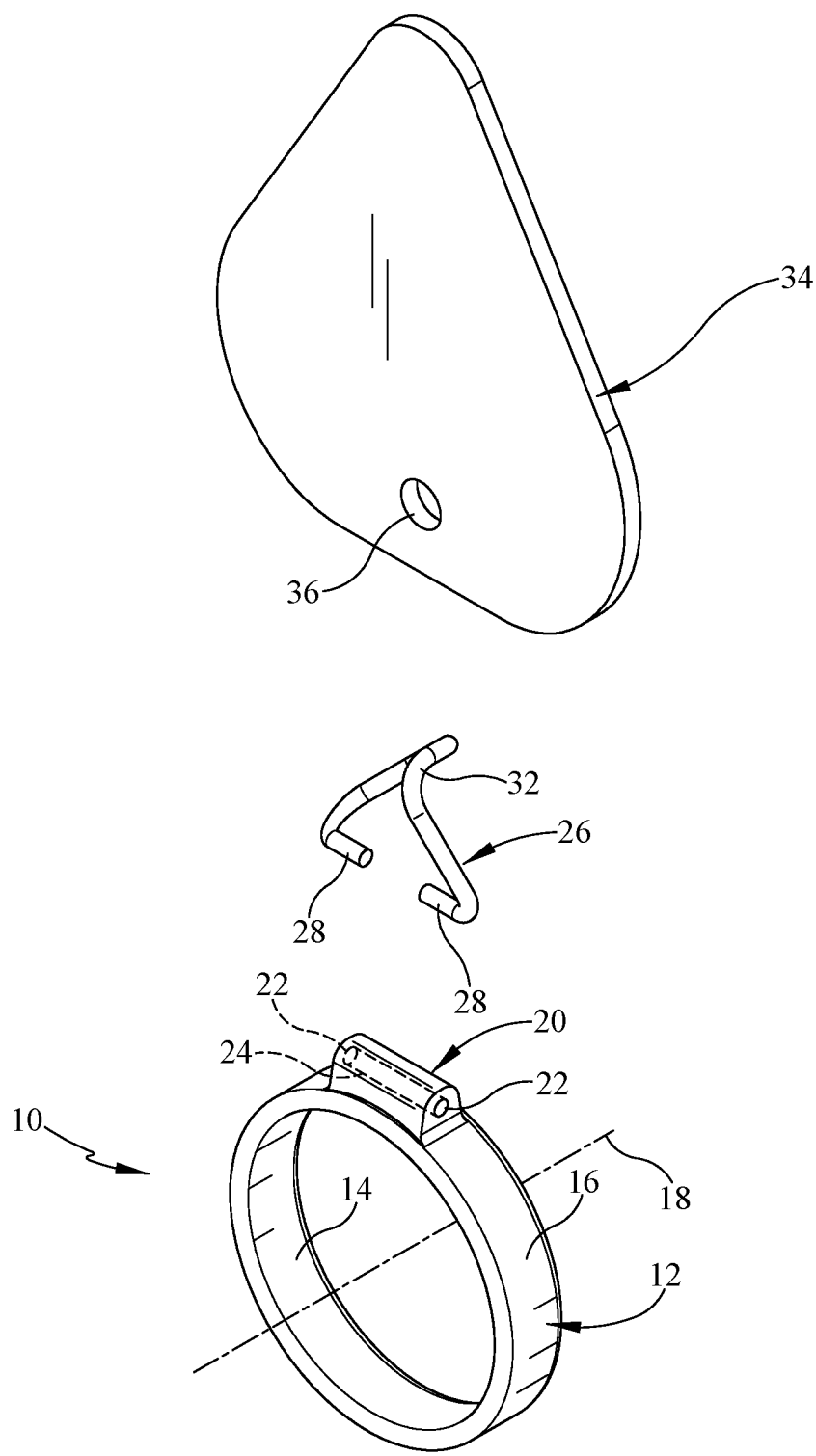
FIG. 3 is an exploded perspective view of the flip ring for holding a guitar pick.
Figure 4:
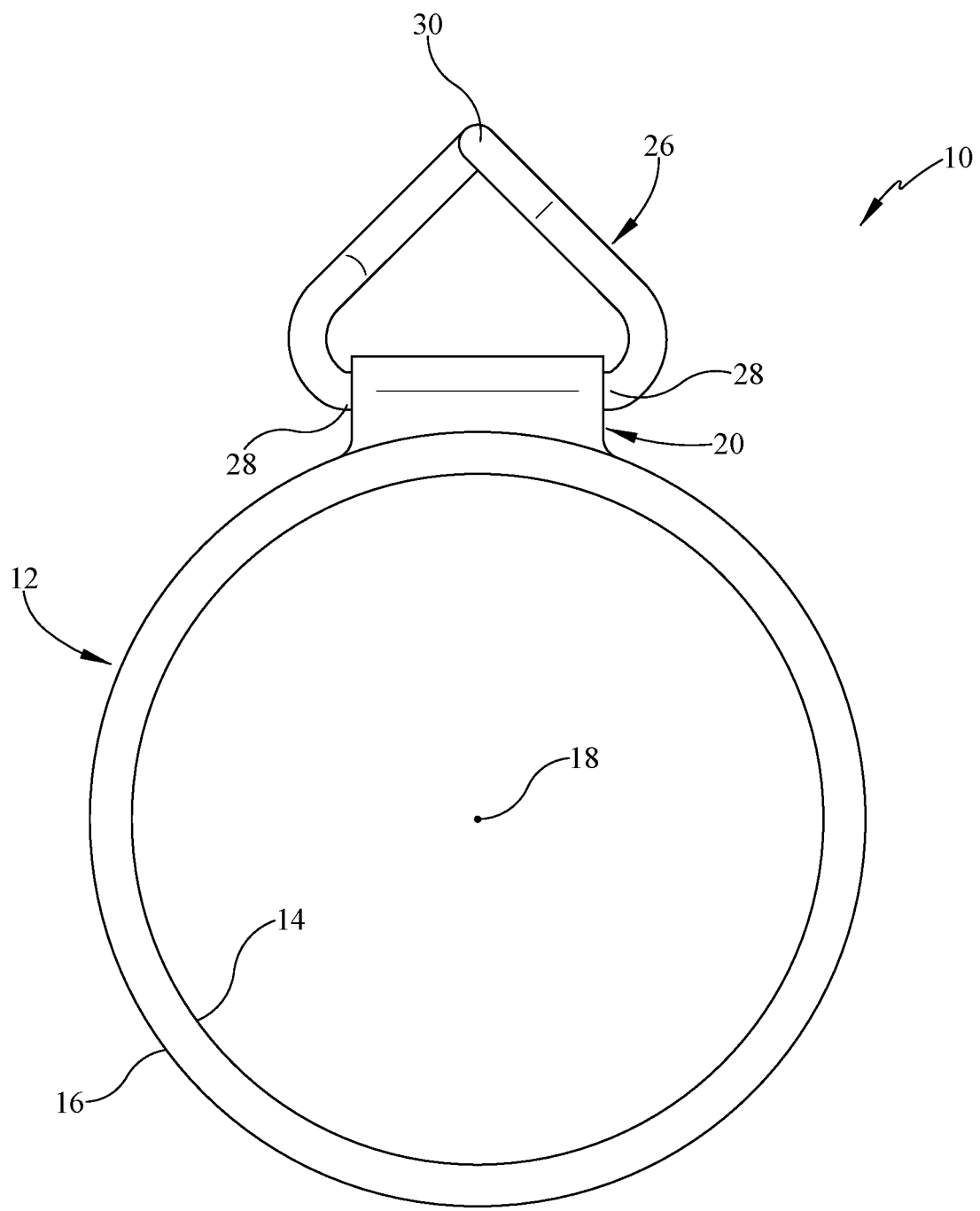
FIG. 4 is a front view of the flip ring for holding a guitar pick.
Figure 5:
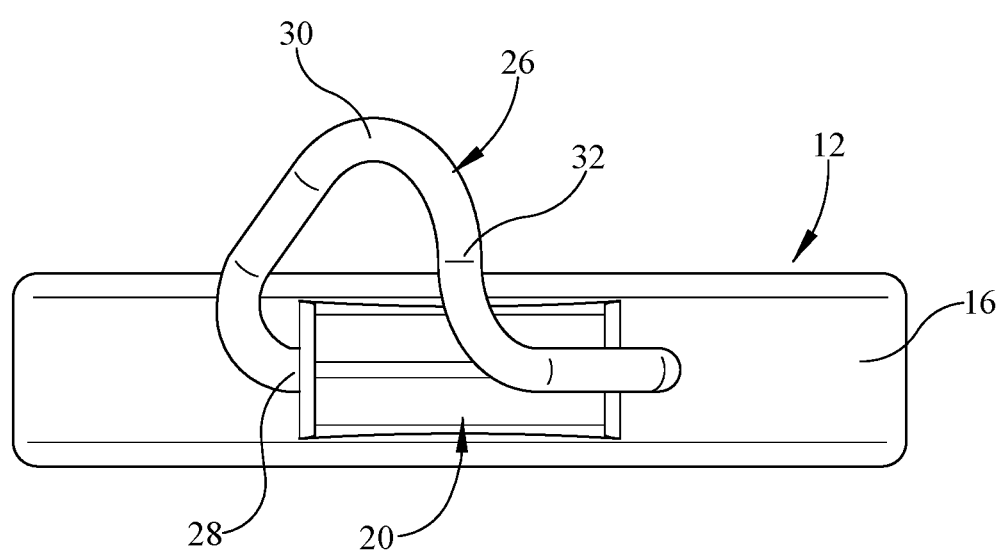
FIG. 5 is a top view of the flip ring for holding a guitar pick.

Referring now to the drawings, it is seen that the flip ring for holding a guitar pick of the present invention, generally denoted by reference numeral 10, is comprised of a ring member 12 of any desired style. The ring member 12 has an inner circumference 14 and an outer circumference 16 so that a first longitudinal axis 18 passes centrally through the ring's opening. The ring member 12 is appropriately sized to be worn on a finger F (possibly the index finger F or a thumb) of a user. A riser 20 rises upwardly from a portion of the outer circumference 16 of the ring member 12 and has a pair of riser openings 22 facing in opposing directions, each riser opening 22 facing generally toward the outer circumference 16 of the ring member 12. A second longitudinal axis 24 passes through the riser openings 22. The second longitudinal axis 24 is oriented in generally normal fashion with respect to the first longitudinal axis 18 and is tangential and, slightly offset with the outer circumference 16 of the ring member 12. The riser openings 22 may, but need not be, connected (connection not illustrated) so as to form a hollow passage through the riser 20. The ring member 12 and the riser 20 can be formed as a single integral unit (indeed possibly monolithic), or can be formed as separate units attached together in appropriate fashion. The ring member 12 and the riser 20 are each made from any appropriate ring forming material such as metal, plastic, silicone and the like, and may be decorated as desired.

An offset clasp 26 has a pair of end prongs 28 that face each other and has a clasp body 30 that curves upwardly from each prong 28 and also curves rearwardly from each end prong 28 (curves radially away from an axis that passes through the end prongs 28) so that at least one leg 32 of the clasp body 30 is relatively straight and is oriented generally normal to the axis passing through the end prongs 28. The offset clasp 26 can be made from the same or similar materials used to form the ring member 12 and riser 20.

In order to use the flip ring for holding a guitar pick 10 of the present invention, a guitar pick 34 is selected and is threaded onto the offset clasp 26 by passing one of the end prongs 28 through the opening 36 of the guitar pick 34. The guitar pick 34 is then slid along the offset clasp 26 until it reaches the straight leg 32 noted—the curves of the offset clasp 26 are dimensioned so as to permit the guitar pick 34 to be able to maneuver therearound. The offset clasp 26 is attached to the ring member 12 by inserting each end prong 28 into a respective one of the riser openings 22 of the riser 20. The offset clasp 26 is sufficiently resilient so that the end prongs 28 can be slightly spread apart for insertion into their respective riser openings 22 and thereafter resiliently return to a relaxed state wherein a portion of each end prong 28 is rotatably resident within its opening 22. The guitar pick 34 is now in position for use. A user places the ring member 12 about their finger F or thumb and holds the guitar pick 34 in desired fashion. When playing the guitar via the guitar pick 34, the user can switch to finger plucking by simply rotating the offset clasp 26 and the attached guitar pick 34 out of the way, freeing their fingers to pluck the strings. When the user desires to return back to pick playing, the offset clasp 26 is spun back into the user's grasp. If the user loses their grip on the guitar pick 34 for any reason, the guitar pick 34 remains attached to their finger F or thumb via the ring member 12 being worn on the finger F or thumb so that the user simply once again grasps the guitar pick 34 and plays as desired.

As seen, the guitar pick 34 can spin or otherwise rotate sideways about the offset clasp 26 and can also flex back and forth. Additionally, the offset clasp 26 can rotate about the riser 20 and can also turn/pivot slightly thereabout. These various rotational and pivoting abilities allow the user to position the guitar pick 34 as desired for playing as well as stowing when use of the guitar pick 34 is not needed. By reversing the offset clasp 26 to the other side, the artist can use their finger F without the guitar pick 34 being in the way.

Figure 6:
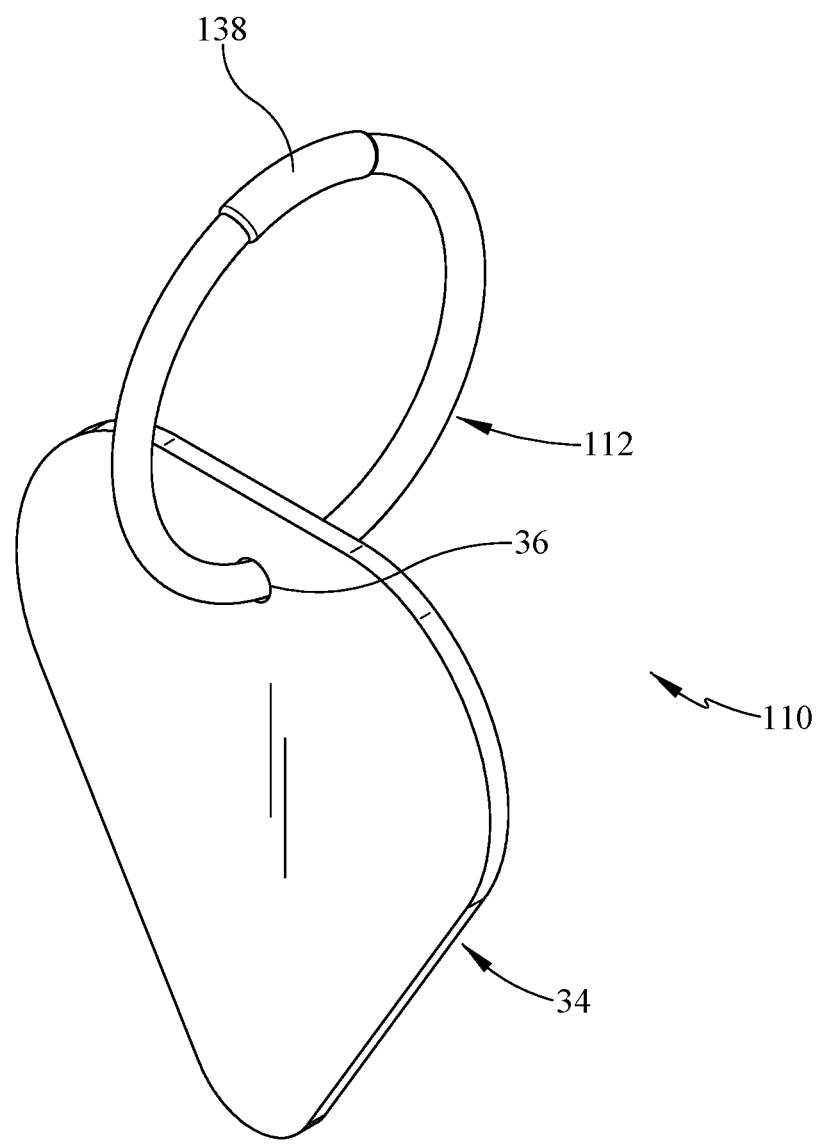
FIG. 6 is a perspective view of an alternate embodiment of the flip ring for holding a guitar pick of the present invention.
Figure 7:
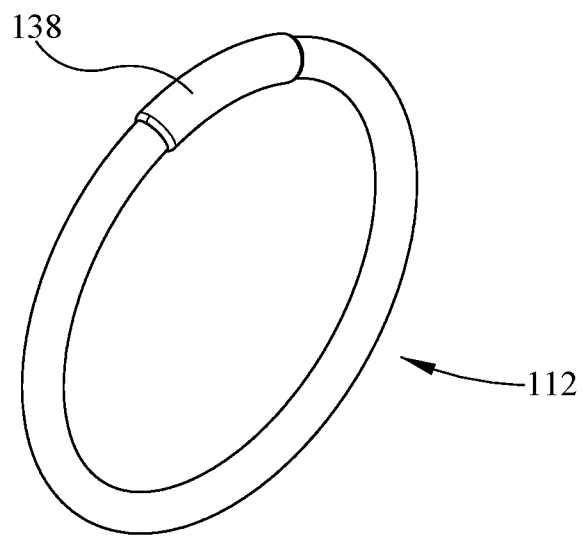
FIG. 7 is an exploded perspective view of the flip ring for holding a guitar pick of FIG. 6.
Figure 7:
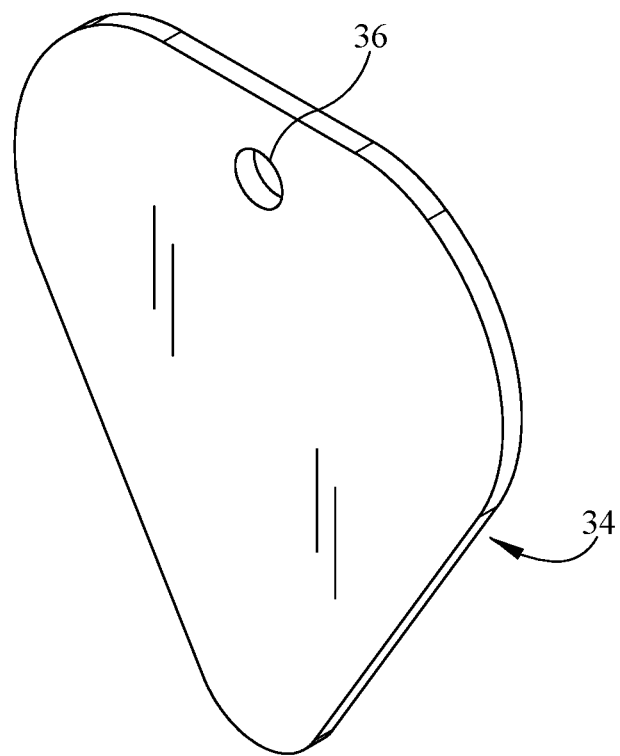
Figure 8:
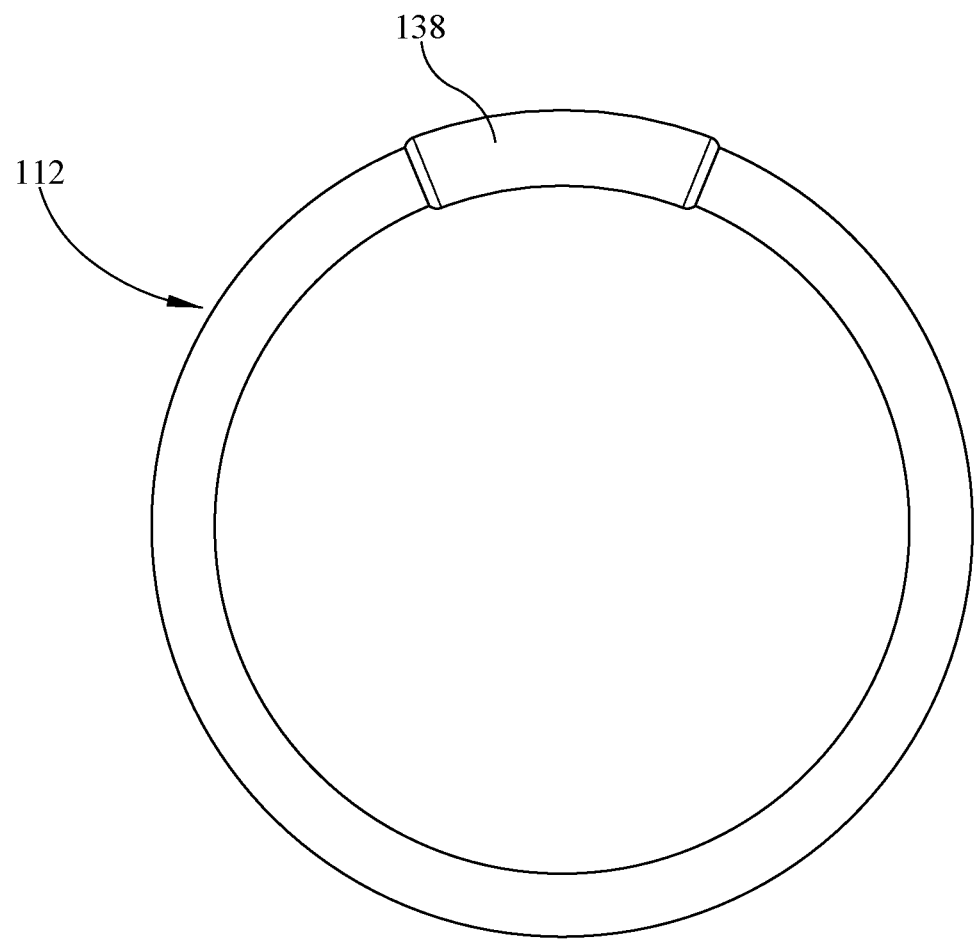
FIG. 8 is a front view of the flip ring for holding a guitar pick of FIG. 6.
Figure 9:
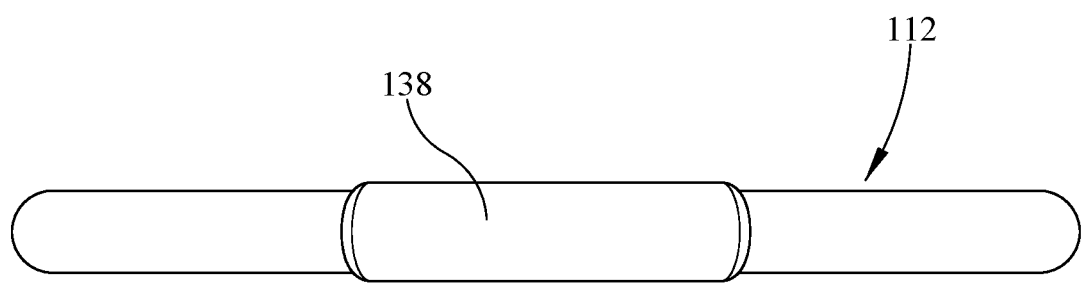
FIG. 9 is a top view of the flip ring for holding a guitar pick of FIG. 6.

As seen in FIGS. 6-9, an alternate embodiment of the flip ring for holding a guitar pick of the present invention, generally denoted by reference numeral 110, comprises a ring member 112 that is made from an elongate elasticized material that is formed into a closed loop circular member by bringing its ends together and connecting the ends together via a crimp coupling 138, the ring member 112 passing through the opening 36 of the guitar pick 34 prior to installing the crimp coupling 138. The ring member 112 is positioned onto a user's finger or thumb and held thereon via the resilient nature of the ring member 112. The user places the ring member 112 about their finger or thumb and holds the guitar pick in desired fashion. When playing the guitar via the guitar pick, the user can switch to finger plucking by simply spinning the guitar pick out of the way about the ring member 112. When the user desires to return back to pick playing, the guitar pick is spun back into the user's grasp. If the user loses their grip on the guitar pick for any reason, the guitar pick remains attached to their finger or thumb via the ring member 112 being worn on the finger or thumb so that the user simply once again grasps the guitar pick and plays as desired.

While the invention has been particularly shown and described with reference to an embodiment thereof, it will be appreciated by those skilled in the art that various changes in form and detail may be made without departing from the spirit and scope of the invention.

I claim:

1. A holder in combination with a guitar pick, the guitar pick being in the shape of an isosceles triangle with rounded corners such that the pick has a pair of legs of equal length joined by a base such that the two legs join together at a vertex angle and each leg joins the base at a base angle, the guitar pick also having a pick opening that is located proximate the base and is equidistant from the two base angles, the holder comprising a closed loop ring member dimensioned and adapted to be placed onto a finger or a thumb of a user so as to encircle the finger or the thumb upon which the ring member is placed, the ring member being made from a resilient material and directly passing through the opening of the guitar pick such that the guitar pick can slide long a length of the ring member.

2. A holder for a guitar pick, the guitar pick having a pick opening, the holder comprising:
   a ring member having an inner circumference and an outer circumference and a first longitudinal axis passing through an opening bounded by the inner circumference;
   a riser located on a portion of the outer circumference, the riser having a pair of opposing riser openings such that a second longitudinal axis passes through the pair of riser openings and is oriented substantially normal with the first longitudinal axis; and
   an offset clasp adapted to be received within the pick opening of the guitar pick, the offset clasp attached to each of the pair of riser openings.

3. The holder for a guitar pick as in claim 2 wherein the offset clasp is rotatably attached to the riser openings.

4. The holder for a guitar pick as in claim 3 wherein the offset clasp has a pair of prongs such that each prong is received within a respective one of the riser openings.

5. The holder for a guitar pick as in claim 2 wherein the offset clasp has a pair of prongs such that each prong is rotatably received within a respective one of the riser openings.

6. The holder for a guitar pick as in claim 2 wherein the offset clasp is made from a resilient material.

7. The holder for a guitar pick as in claim 2 in combination with the guitar pick.

8. The holder for a guitar pick as in claim 7 wherein the offset clasp is rotatably attached to the riser openings.

9. The holder for a guitar pick as in claim 8 wherein the offset clasp has a pair of prongs such that each prong is received within a respective one of the riser openings.

10. The holder for a guitar pick as in claim 7 wherein the offset clasp has a pair of prongs such that each prong is rotatably received within a respective one of the riser openings.

11. The holder for a guitar pick as in claim 7 wherein the offset clasp is made from a resilient material.

\* \* \* \* \*